(12) United States Patent
Noh et al.

(10) Patent No.: US 11,881,149 B2
(45) Date of Patent: Jan. 23, 2024

(54) SIGNAL PROCESSING DEVICE AND IMAGE DISPLAY DEVICE COMPRISING SAME

(71) Applicant: LG ELECTRONICS INC., Seoul (KR)

(72) Inventors: Hyunchul Noh, Seoul (KR); Kyejong Yim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/755,375

(22) PCT Filed: Nov. 1, 2019

(86) PCT No.: PCT/KR2019/014765
§ 371 (c)(1),
(2) Date: Apr. 27, 2022

(87) PCT Pub. No.: WO2021/085697
PCT Pub. Date: May 6, 2021

(65) Prior Publication Data
US 2022/0375394 A1    Nov. 24, 2022

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0842* (2013.01);
(Continued)

(58) Field of Classification Search
CPC ............... G09G 3/2096; G09G 3/3233; G09G 2300/0842; G09G 2300/021; G09G 2360/18; G09G 2340/04
See application file for complete search history.

(56) References Cited

U.S. PATENT DOCUMENTS

2006/0164424 A1   7/2006  Wiley et al.
2007/0035535 A1*  2/2007  Lee ........................ G09G 3/20
                                                        345/204
(Continued)

FOREIGN PATENT DOCUMENTS

KR    2020000014385    7/2000
KR    1020090016846    2/2009
(Continued)

OTHER PUBLICATIONS

PCT International Application No. PCT/KR2019/014765, International Search Report dated Jul. 22, 2020, 3 pages.

*Primary Examiner* — Towfiq Elahi
(74) *Attorney, Agent, or Firm* — LEE, HONG, DEGERMAN, KANG & WAIMEY

(57) ABSTRACT

The signal processing device according to an embodiment of the present disclosure includes: a frame buffer to store an input image and output an output image, an output synchronization signal calculator to calculate an output synchronization signal based on an input synchronization signal and a size or a position of the output image in comparison with the input image, and an output synchronization signal output interface to output a variable output synchronization signal of which a start timing changes based on a signal from the output synchronization signal calculator, wherein a difference between a start timing of the input synchronization signal and a start timing of the output synchronization signal changes based on the size of the output image. Accordingly, a delay time may be reduced in response to the output image having a size different from a size of the input image being output.

17 Claims, 17 Drawing Sheets

(52) U.S. Cl.
CPC ... *G09G 2330/021* (2013.01); *G09G 2340/04* (2013.01); *G09G 2360/18* (2013.01)

(56) References Cited

U.S. PATENT DOCUMENTS

| | | | | |
|---|---|---|---|---|
| 2011/0018887 | A1* | 1/2011 | Uchiyama | G09G 5/006 345/545 |
| 2013/0100246 | A1* | 4/2013 | Kim | H04N 13/398 348/43 |

FOREIGN PATENT DOCUMENTS

| | | |
|---|---|---|
| KR | 1020120074517 | 7/2012 |
| KR | 1020140092002 | 7/2014 |

* cited by examiner though the image and an image display apparatus including the same.

SIGNAL PROCESSING DEVICE AND IMAGE DISPLAY DEVICE COMPRISING SAME

CROSS-REFERENCE TO RELATED APPLICATIONS

This application is the National Stage filing under 35 U.S.C. 371 of International Application No. PCT/KR2019/014765, filed on Nov. 1, 2019, the contents of which are all incorporated by reference herein in its entirety.

BACKGROUND OF THE DISCLOSURE

1. Field of the Disclosure

The present disclosure relates to a signal processing device and an image display apparatus including the same, and more particularly to a signal processing device capable of reducing a delay time in outputting an output image having a size different from a size of an input image and an image display apparatus including the same.

2. Description of the Related Art

A signal processing device is a device that performs signal processing on an input image so as to display an image.

For example, the signal processing device may receive a broadcast signal or an HDMI signal, performs signal processing based on the received broadcast or HDMI signal, and output a processed image signal.

Meanwhile, an input image input from the exterior is stored in a frame buffer and outputted after a predetermined time.

In this case, when the input image and the output image are the same size, the input image stored in the frame buffer is output after a predetermined time without any special processing. However, in the state that the input image and the output image are different sizes, in the case that the output image of which the size is changed is output based on a fixed output synchronization signal, based on a position or a size of the output image on a screen, a problem occurs in that the screen is abnormal and abnormally displayed.

Furthermore, there is a disadvantage that there is a significant delay time in response to the output image having a size different from a size of the input image being output.

SUMMARY

An object of the present disclosure is to provide a signal processing device capable of reducing a delay time in outputting an output image having a size different from a size of an input image and an image display apparatus including the same.

Another object of the present disclosure is to provide a signal processing device capable of displaying a screen normally when an output image of which the size is different from a size of the input image is output, and an image display apparatus including the same.

In order to achieve the above objects, there are provided a signal processing device and an image display apparatus including the same according to an embodiment of the present disclosure, and the signal processing device includes: a frame buffer configured to store an input image and output an output image corresponding to the input image, an output synchronization signal calculator configured to calculate an output synchronization signal based on an input synchronization signal and a size or a position of the output image in comparison with the input image, and an output synchronization signal output interface configured to output a variable output synchronization signal of which a start timing changes based on a signal from the output synchronization signal calculator, wherein a difference between a start timing of the input synchronization signal and a start timing of the output synchronization signal changes based on the size of the output image in comparison with the input image.

Meanwhile, it is preferable that the difference between a start timing of the input synchronization signal and a start timing of the output synchronization signal changes based on the position of the output image in comparison with the input image.

Meanwhile, it is preferable that as the size of the output image decreases in comparison with the input image, a difference between a start timing of the input synchronization signal and a start timing of the output synchronization signal increases.

Meanwhile, it is preferable that as a position of the output image becomes closer to a lower direction of a display in comparison with the input image, a difference between a start timing of the input synchronization signal and a start timing of the output synchronization signal increases.

Meanwhile, it is preferable that an output end timing of an output image having a first size in response to the output image having the first size being output from the frame buffer is the same as an output end timing of an output image having a second size in response to the output image having the second size, which is less than the first size, being output from the frame buffer in comparison with an input image.

Meanwhile, it is preferable that an output end timing of an output image having the second size, in comparison with the input image, is the same as an output end timing of an output image having a third size in response to the output image having the third size, which is less than the second size, being output from the frame buffer in comparison with the input image.

Meanwhile, it is preferable that an output start timing of the output image having the second size output from the frame buffer is later than an output start timing of the output image having the first size output from the frame buffer.

Meanwhile, it is preferable that an output start timing of the output image having the third size output from the frame buffer is later than an output start timing of the output image having the first size output from the frame buffer.

Meanwhile, it is preferable that an output start timing of the output image having the second size output from the frame buffer is earlier than an output end timing of the output image having the first size output from the frame buffer.

Meanwhile, it is preferable that an output start timing of the output image having the third size output from the frame buffer is earlier than an output end timing of the output image having the first size output from the frame buffer.

Meanwhile, the signal processing device may further include an output adjustor configured to determine a size or a position of the output image.

Meanwhile, a signal processing device and an image display apparatus including the same according to another embodiment of the present disclosure, and the signal processing device includes: a frame buffer configured to store an input image and output an output image corresponding to the input image, wherein a difference between a start timing of the input synchronization signal and a start timing of the output synchronization signal of the frame changes based on a size or a position of the output image in comparison with the input image. Accordingly, a delay time may be reduced in response to the output image having a size different from a size of the input image being output. Furthermore, a screen may be normally displayed in response to the output image having a size different from a size of the input image being output.

Meanwhile, it is preferable that as the size of the output image decreases in comparison with the input image, a difference between a start timing of the input synchronization signal and a start timing of the output synchronization signal increases.

Meanwhile, it is preferable that as a position of the output image becomes closer to a lower direction of a display in comparison with the input image, a difference between a start timing of the input synchronization signal and a start timing of the output synchronization signal increases.

Meanwhile, it is preferable that an output end timing of an output image having a first size in response to the output image having the first size being output from the frame buffer is the same as an output end timing of an output image having a second size in response to the output image having the second size, which is less than the first size, being output from the frame buffer in comparison with an input image.

Meanwhile, it is preferable that an output end timing of an output image having the second size, in comparison with the input image, is the same as an output end timing of an output image having a third size in response to the output image having the third size, which is less than the second size, being output from the frame buffer in comparison with the input image.

Meanwhile, it is preferable that an output start timing of the output image having the second size output from the frame buffer is earlier than an output end timing of the output image having the first size output from the frame buffer.

Meanwhile, it is preferable that an output start timing of the output image having the third size output from the frame buffer is earlier than an output end timing of the output image having the first size output from the frame buffer.

Effects of the Disclosure

A signal processing device and an image display apparatus including the same according to an embodiment of the present disclosure includes: a frame buffer configured to store an input image and output an output image corresponding to the input image, an output synchronization signal calculator configured to calculate an output synchronization signal based on an input synchronization signal and a size or a position of the output image in comparison with the input image, and an output synchronization signal output interface configured to output a variable output synchronization signal of which a start timing changes based on a signal from the output synchronization signal calculator, wherein a difference between a start timing of the input synchronization signal and a start timing of the output synchronization signal changes based on the size of the output image in comparison with the input image. Accordingly, a delay time may be reduced in response to the output image having a size different from a size of the input image being output. Furthermore, a screen may be normally displayed in response to the output image having a size different from a size of the input image being output.

Meanwhile, it is preferable that the difference between a start timing of the input synchronization signal and a start timing of the output synchronization signal changes based on the position of the output image in comparison with the input image. Accordingly, a delay time may be reduced in response to the output image of a position different from a position of the input image being output.

Meanwhile, it is preferable that as the size of the output image decreases in comparison with the input image, a difference between a start timing of the input synchronization signal and a start timing of the output synchronization signal increases. Accordingly, a delay time may be reduced in response to the output image having a size different from a size of the input image being output. Furthermore, a screen may be normally displayed in response to the output image having a size different from a size of the input image being output.

Meanwhile, it is preferable that as a position of the output image becomes closer to a lower direction of a display in comparison with the input image, a difference between a start timing of the input synchronization signal and a start timing of the output synchronization signal increases. Accordingly, a delay time may be reduced in response to the output image of a position different from a position of the input image being output.

Meanwhile, it is preferable that an output end timing of an output image having a first size in response to the output image having the first size being output from the frame buffer is the same as an output end timing of an output image having a second size in response to the output image having the second size, which is less than the first size, being output from the frame buffer in comparison with an input image. Accordingly, a delay time may be reduced in response to the output image having a size different from a size of the input image being output.

Meanwhile, it is preferable that an output end timing of an output image having the second size, in comparison with the input image, is the same as an output end timing of an output image having a third size in response to the output image having the third size, which is less than the second size, being output from the frame buffer in comparison with the input image. Accordingly, a delay time may be reduced in response to the output image having a size different from a size of the input image being output.

Meanwhile, it is preferable that an output start timing of the output image having the second size output from the frame buffer is later than an output start timing of the output image having the first size output from the frame buffer. Accordingly, a delay time may be reduced in response to the output image having a size different from a size of the input image being output.

Meanwhile, it is preferable that an output start timing of the output image having the third size output from the frame buffer is later than an output start timing of the output image having the first size output from the frame buffer. Accordingly, a delay time may be reduced in response to the output image having a size different from a size of the input image being output.

Meanwhile, it is preferable that an output start timing of the output image having the second size output from the frame buffer is earlier than an output end timing of the output image having the first size output from the frame buffer. Accordingly, a delay time may be reduced in response to the output image having a size different from a size of the input image being output.

Meanwhile, it is preferable that an output start timing of the output image having the third size output from the frame buffer is earlier than an output end timing of the output image having the first size output from the frame buffer.

Accordingly, a delay time may be reduced in response to the output image having a size different from a size of the input image being output.

Meanwhile, the signal processing device may further include an output adjustor configured to determine a size or a position of the output image. Accordingly, a delay time may be reduced in response to the output image having a size different from a size of the input image being output.

Meanwhile, a signal processing device and an image display apparatus including the same according to another embodiment of the present disclosure, and the signal processing device includes: a frame buffer configured to store an input image and output an output image corresponding to the input image, wherein a difference between a start timing of the input synchronization signal and a start timing of the output synchronization signal of the frame changes based on a size or a position of the output image in comparison with the input image. Accordingly, a delay time may be reduced in response to the output image having a size or a position different from a size or a position of the input image being output. Furthermore, a screen may be normally displayed in response to the output image having a size different from a size of the input image being output.

Meanwhile, it is preferable that as the size of the output image decreases in comparison with the input image, a difference between a start timing of the input synchronization signal and a start timing of the output synchronization signal increases. Accordingly, a delay time may be reduced in response to the output image having a size different from a size of the input image being output.

Meanwhile, it is preferable that as a position of the output image becomes closer to a lower direction of a display in comparison with the input image, a difference between a start timing of the input synchronization signal and a start timing of the output synchronization signal increases. Accordingly, a delay time may be reduced in response to the output image of a position different from a position of the input image being output.

Meanwhile, it is preferable that an output end timing of an output image having a first size in response to the output image having the first size being output from the frame buffer is the same as an output end timing of an output image having a second size in response to the output image having the second size, which is less than the first size, being output from the frame buffer in comparison with an input image. Accordingly, a delay time may be reduced in response to the output image having a size different from a size of the input image being output.

Meanwhile, it is preferable that an output end timing of an output image having the second size, in comparison with the input image, is the same as an output end timing of an output image having a third size in response to the output image having the third size, which is less than the second size, being output from the frame buffer in comparison with the input image. Accordingly, a delay time may be reduced in response to the output image having a size different from a size of the input image being output.

Meanwhile, it is preferable that an output start timing of the output image having the second size output from the frame buffer is earlier than an output end timing of the output image having the first size output from the frame buffer. Accordingly, a delay time may be reduced in response to the output image having a size different from a size of the input image being output.

Meanwhile, it is preferable that an output start timing of the output image having the third size output from the frame buffer is earlier than an output end timing of the output image having the first size output from the frame buffer. Accordingly, a delay time may be reduced in response to the output image having a size different from a size of the input image being output.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
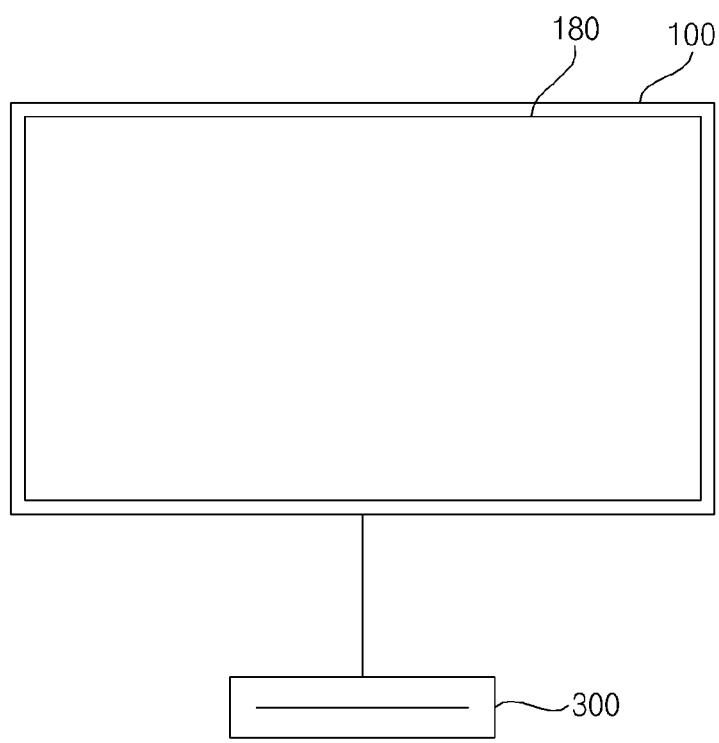
FIG. 1 is a diagram showing an image display system according to an embodiment of the present disclosure.

FIG. 1 is a diagram showing an image display system according to an embodiment of the present disclosure.

Referring to the drawing, an image display apparatus 100 may receive an image input from a set-top box 300.

For example, in the case that the set-top box 300 is a game device, a game image for 1 person or a game image for 2 persons may be input.

Meanwhile, in the case that the game image for 1 person is input, a frame buffer (FB) in a signal processor 170 may output an output image having a size which is the same size as the input image without any change.

On the other hand, in the case that the game image for 2 persons is input, the frame buffer (FB) in the signal processor 170 may output an output image of which the size of the input image is changed.

In this case, in the state that the input image and the output image are different sizes, in the case that the output image of which the size is changed is output based on a fixed output synchronization signal, based on a position or a size on a screen, a problem occurs in that the screen is abnormal and abnormally displayed.

Furthermore, there is a disadvantage that there is a significant delay time in response to the output image having a size different from a size of the input image being output.

Accordingly, the present disclosure proposes a method of reducing a delay time in outputting an output image having a size different from a size of an input image.

In addition, the present disclosure proposes a method of displaying a screen normally in outputting an output image having a size different from a size of an input image.

Meanwhile, the image display apparatus 100 according to an embodiment of the present disclosure includes a frame buffer (FB) configured to store an input image and output an output image corresponding to the input image, an output synchronization signal calculator 1130 configured to calculate an output synchronization signal based on an input synchronization signal Vsync of the frame buffer (FB) and a size or a position of the output image in comparison with the input image, an output synchronization signal output interface 1140 configured to output a variable output synchronization signal of which a start timing changes based on a signal from the output synchronization signal calculator 1130, and it is preferable that a difference between a start timing of the input synchronization signal Vsync of the frame buffer (FB) and a start timing of the output synchronization signal SNCb of the frame buffer (FB) varies. Furthermore, a screen may be normally displayed in outputting the output image having a size different from a size of the input image.

Meanwhile, the image display apparatus 100 according to an embodiment of the present disclosure includes a frame buffer (FB) configured to store an input image and output an output image corresponding to the input image, and it is preferable that a difference between a start timing of the input synchronization signal Vsync of the frame buffer (FB) and a start timing of the output synchronization signal SNCb of the frame buffer (FB) varies. Furthermore, a screen may be normally displayed in outputting the output image having a size different from a size of the input image.

Meanwhile, the image display apparatus 100 in FIG. 1 may be a TV, a monitor, a tablet PC, a mobile terminal, a display for a vehicle, etc.

Figure 2:
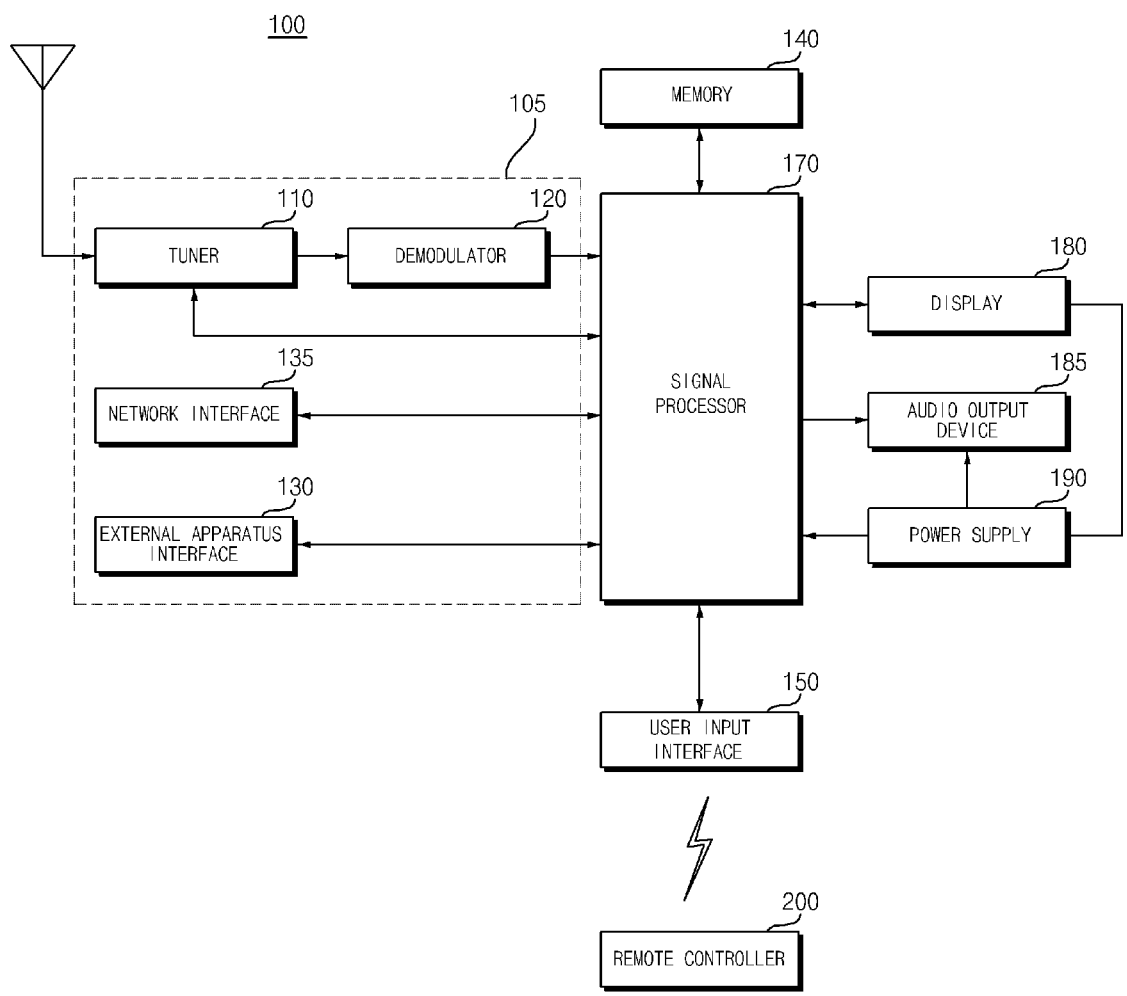
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor device (not shown), a signal processor 170, a display 180, and an audio output device 185.

The image receiver 105 may include a tuner 110, a demodulator 120, a network interface 135, and an external apparatus interface 130.

Meanwhile, unlike the drawing, the image receiver 105 may include only the tuner 110, the demodulator 120, and the external apparatus interface 130. That is, the network interface 135 may not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or a audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner 110 can process a digital broadcast signal or an analog broadcast signal. The analog baseband image or audio signal (CVBS/SIF) output from the tuner 110 may be directly input to the signal processor 170.

Meanwhile, the tuner 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, a audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output device 185.

The external apparatus interface 130 may transmit or receive data with a connected external apparatus (not shown), e.g., a set-top box 50. To this end, the external apparatus interface 130 may include an A/V input and output device (not shown).

The external apparatus interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless transceiver (not shown) may perform short-range wireless communication with other electronic apparatus.

Through the wireless transceiver (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless transceiver (not shown).

The memory 140 may store a program for each signal processing and control in the signal processor 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function such as a channel map.

Although FIG. 2 illustrates that the memory is provided separately from the signal processor 170, the scope of the present disclosure is not limited thereto. The memory 140 may be included in the signal processor 170.

The user input interface 150 transmits a signal input by the user to the signal processor 170 or transmits a signal from the signal processor 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processor 170, may transfer a user input signal input from a sensor device (not shown) that senses a user's gesture to the signal processor 170, or may transmit a signal from the signal processor 170 to the sensor device (not shown).

The signal processor 170 may demultiplex the input stream through the tuner 110, the demodulator 120, the network interface 135, or the external apparatus interface 130, or process the demultiplexed signals to generate and output a signal for image or audio output.

For example, the signal processor 170 receives a broadcast signal received by the image receiver 105 or an HDMI signal, and perform signal processing based on the received broadcast signal or the HDMI signal to thereby output a processed image signal.

The image signal processed by the signal processor 170 is input to the display 180, and may be displayed as an image corresponding to the image signal. In addition, the image signal processed by the signal processor 170 may be input to the external output apparatus through the external apparatus interface 130.

The audio signal processed by the signal processor 170 may be output to the audio output device 185 as an audio signal. In addition, audio signal processed by the signal processor 170 may be input to the external output apparatus through the external apparatus interface 130.

Although not shown in FIG. 2, the signal processor 170 may include a demultiplexer, an image processor, and the like. That is, the signal processor 170 may perform a variety of signal processing and thus it may be implemented in the form of a system on chip (SOC). This will be described later with reference to FIG. 3.

In addition, the signal processor 170 can control the overall operation of the image display apparatus 100. For example, the signal processor 170 may control the tuner 110 to control the tuning of the RF broadcast corresponding to the channel selected by the user or the previously stored channel.

In addition, the signal processor 170 may control the image display apparatus 100 according to a user command input through the user input interface 150 or an internal program.

Meanwhile, the signal processor 170 may control the display 180 to display an image. At this time, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, or a text.

Meanwhile, the signal processor 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processor 170, an image signal, a data signal, a control signal, and the like received from the external apparatus interface 130.

Meanwhile, the display 180 may be configured as a touch screen and used as an input device in addition to an output device.

The audio output device 185 receives a signal processed by the signal processor 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processor 170.

The signal processor 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output device 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
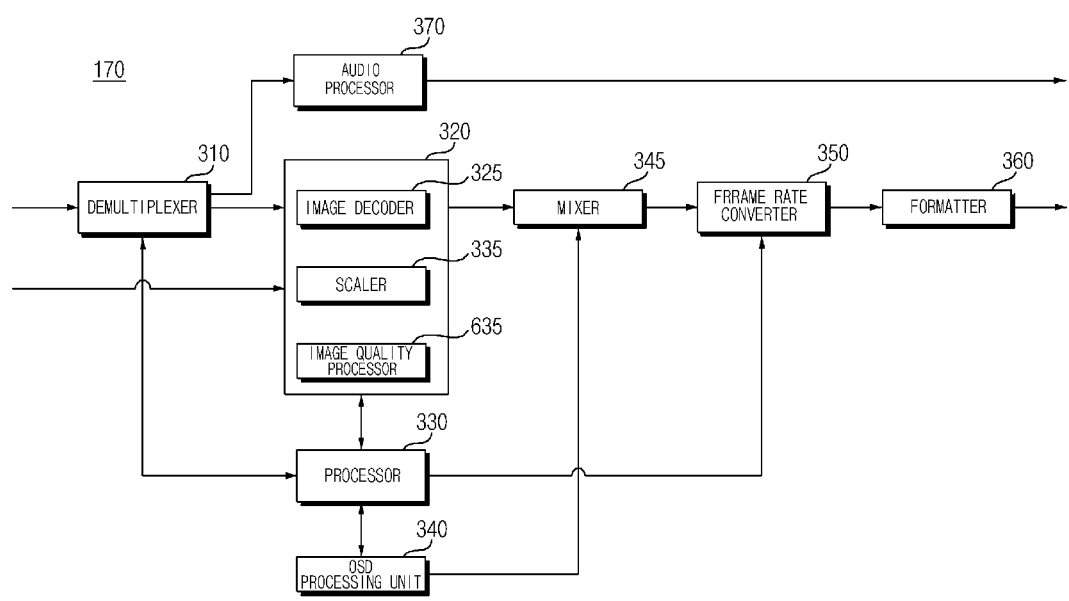
FIG. 3 is an example of an internal block diagram of the signal processor in FIG. 2.

FIG. 3 is an example of an internal block diagram of the signal processor in FIG. 2.

Referring to the drawing, the signal processor 170 according to an embodiment of the present disclosure may include a demultiplexer 310, an image processor 320, a processor 330, and an audio processor 370. In addition, the signal processor 170 may further include and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that can be displayed on the display, based on a pointing signal input from the remote controller 200. In particular, such a pointer may be generated by a pointing signal processor, and the OSD processor 340 may include such a pointing signal processor (not shown). Obviously, the pointing signal processor (not shown) may be provided separately from the OSD processor 340.

The mixer 345 may mix an OSD signal generated by the OSD processor 340 with a decoded image signal image-processed by the image processor 320. The mixed image signal is supplied to the frame rate converter 350.

Meanwhile, the formatter 360 may change a format of an input image signal into a format suitable for displaying the image signal on a display and output the image signal in the changed format.

In particular, the formatter 360 may change a format of an image signal to correspond to a display panel.

Meanwhile, the formatter 360 may change the format of the image signal. For example, it may change the format of the 3D image signal into any one of various 3D formats such as a side by side format, a top/down format, a frame sequential format, an interlaced format, a checker box format, and the like.

The processor 330 may control overall operations of the image display apparatus 100 or the signal processor 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processor 170 shown in FIG. 3 is a block diagram for an embodiment of the present disclosure. Each component of the block diagram may be integrated, added, or omitted according to a specification of the signal processor 170 actually implemented.

In particular, the frame rate converter 350 and the formatter 360 may be provided separately in addition to the image processor 320.

Figure 4A:
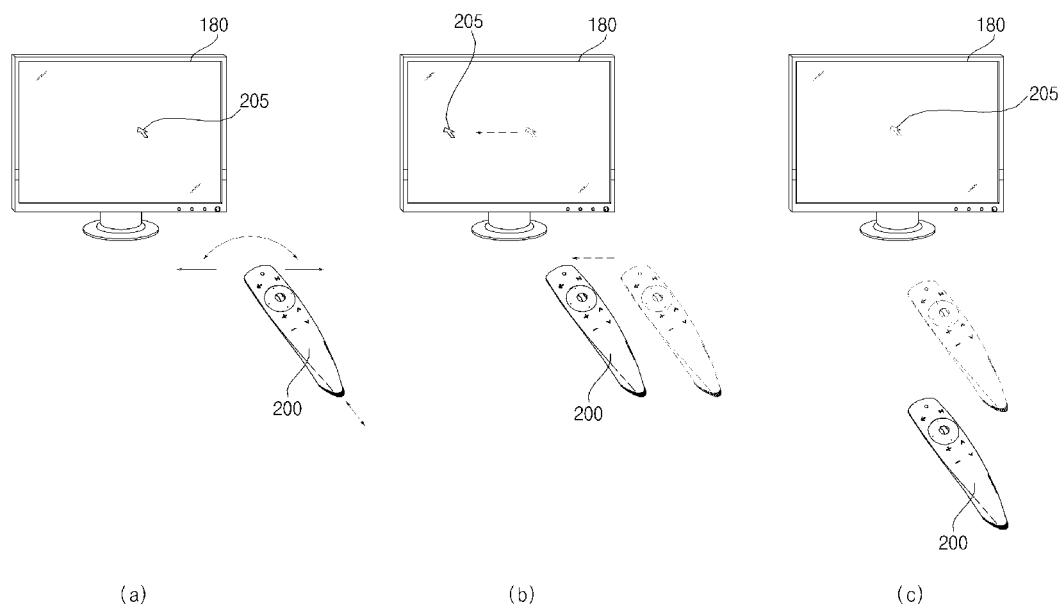
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
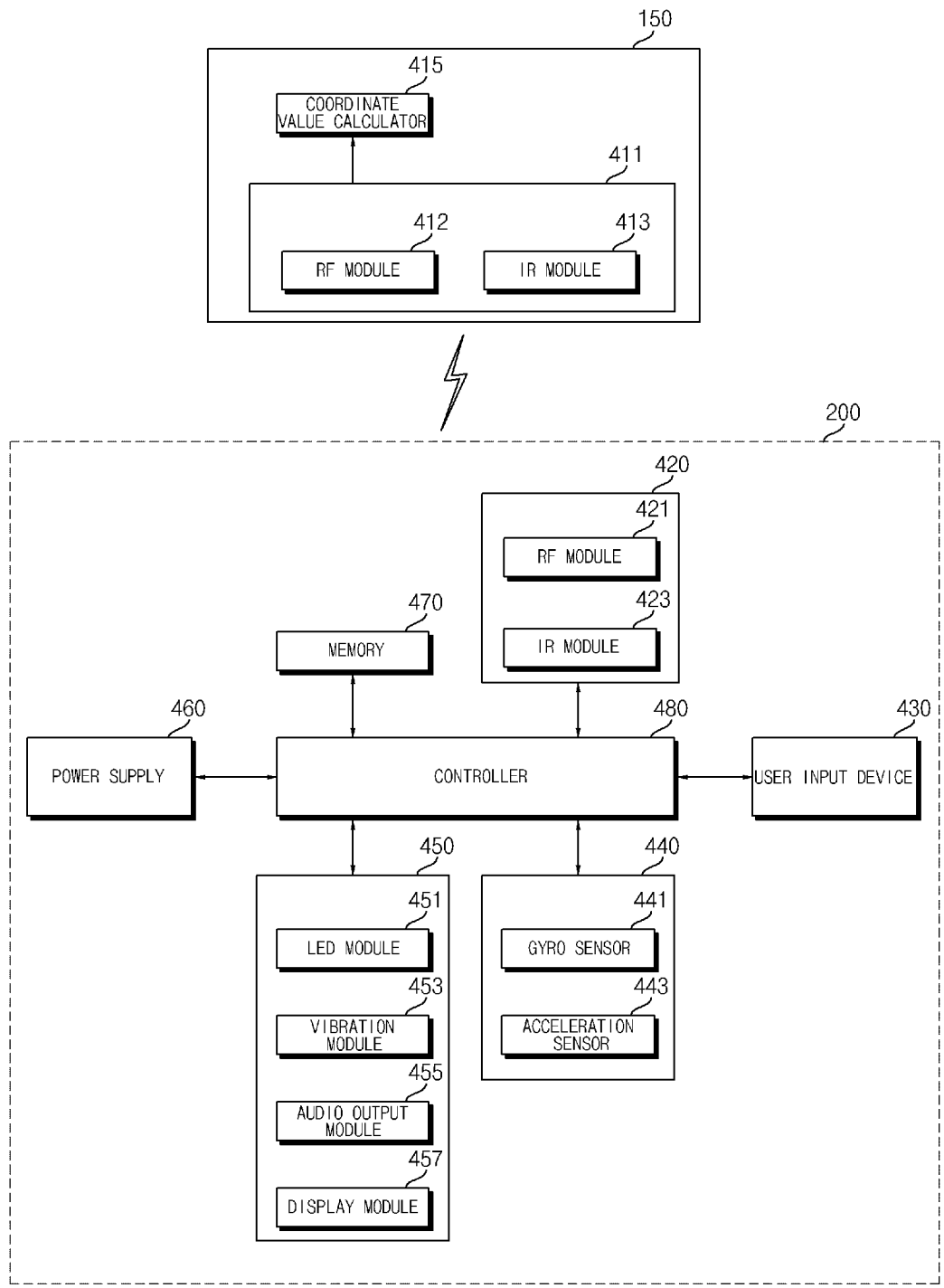
FIG. 4B is an internal block diagram of the remote controller of FIG. 2.

FIG. 4B is an internal block diagram of the remote controller of FIG. 2.

Referring to the drawing, the remote controller 200 includes a wireless transceiver 420, a user input device 430, a sensor device 440, an output device 450, a power supply 460, a memory 470, and a controller 480.

The wireless transceiver 420 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 430 may be implemented by a keypad, a button, a touch pad, a touch screen, or the like. The user may operate the user input device 430 to input a command related to the image display apparatus 100 to the remote controller 200. When the user input device 430 includes a hard key button, the user can input a command related to the image display apparatus 100 to the remote controller 200 through a push operation of the hard key button. When the user input device 430 includes a touch screen, the user may touch a soft key of the touch screen to input the command related to the image display apparatus 100 to the remote controller 200. In addition, the user input device 430 may include various types of input means such as a scroll key, a jog key, etc., which can be operated by the user, and the present disclosure does not limit the scope of the present disclosure.

The sensor device 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 430 or a signal transmitted from the image display apparatus 100. Through the output device 450, the user may recognize whether the user input device 430 is operated or whether the image display apparatus 100 is controlled.

For example, the output device 450 may include an LED module 451 that is turned on when the user input device 430 is operated or a signal is transmitted/received to/from the image display apparatus 100 through the wireless transceiver 420, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 430 or a signal corresponding to the motion of the remote controller 200 sensed by the sensor device 440 to the image display apparatus 100 through the wireless transceiver 420.

The user input interface 150 of the image display apparatus 100 includes a wireless transceiver 151 that can wirelessly transmit and receive a signal to and from the remote controller 200 and a coordinate value calculator 415 that can calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless transceiver 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the drawing, the coordinate value calculator 415 may be provided in the signal processor 170, not in the user input interface 150.

Figure 5:
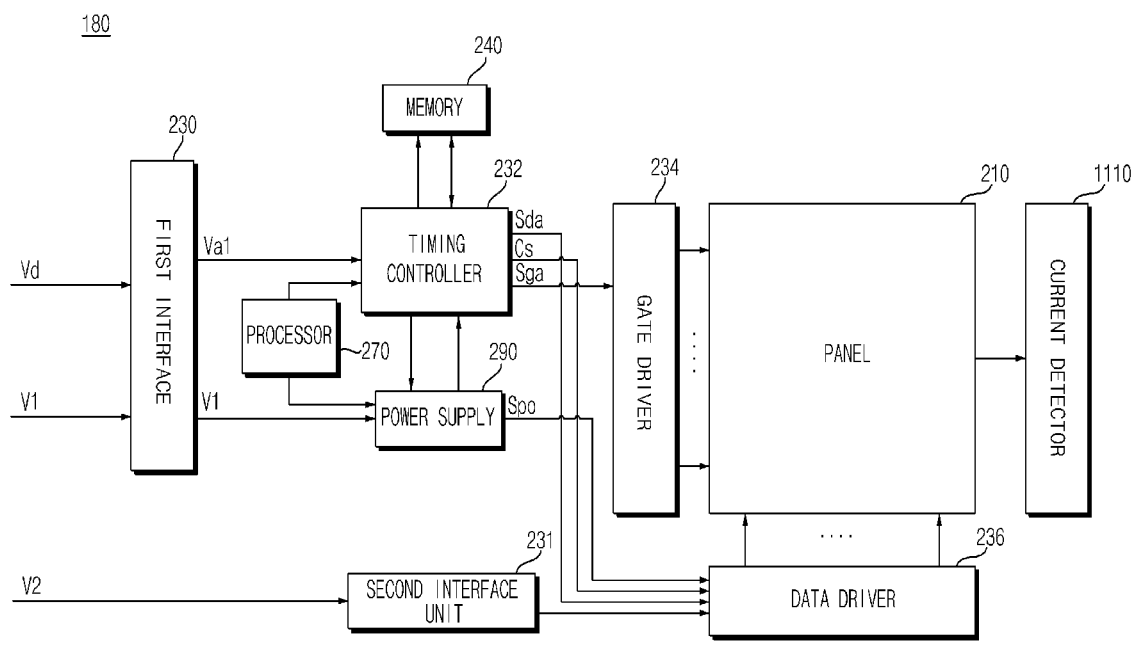
FIG. 5 is an internal block diagram of a display of FIG. 2.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processor 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the signal processor 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 includes a RGBW subpixel, the data driving signal Sda may be a data driving signal for driving of RGBW subpixel.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to be burn in.

Meanwhile, based on a current detected by the current detector 510, the processor 270 may determine that a subpixel having the greatest accumulated current is an expected burn-in subpixel.

Figure 6A:
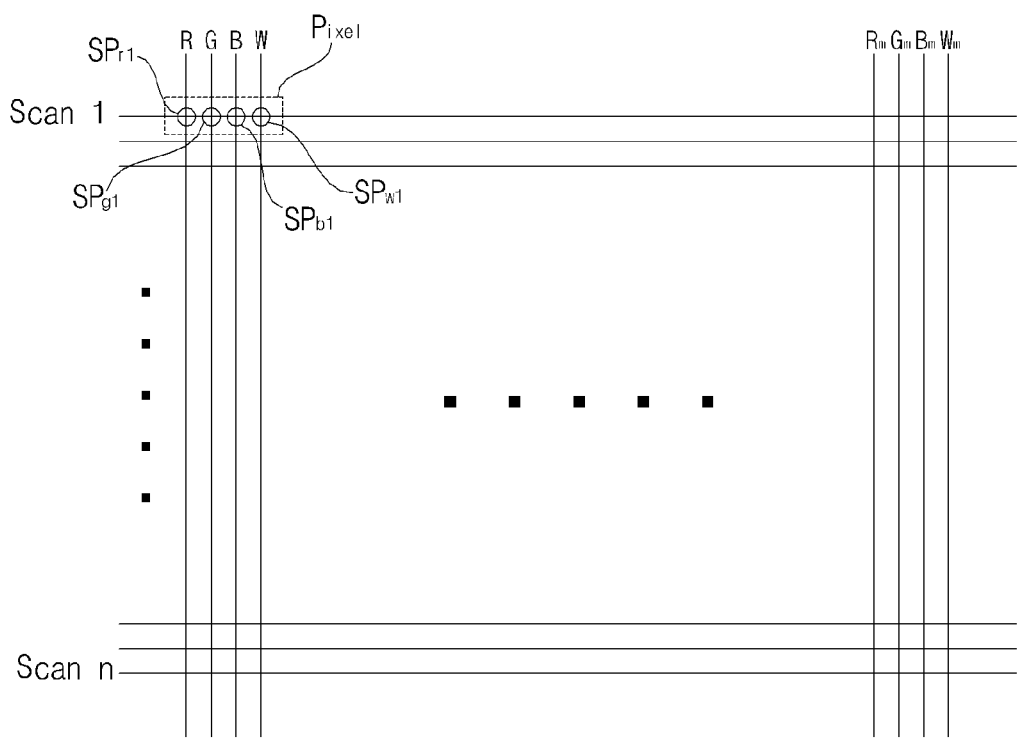
FIG. 6A and FIG. 6B are diagrams referred to in the description of an organic light emitting diode panel of FIG. 5.
Figure 6B:
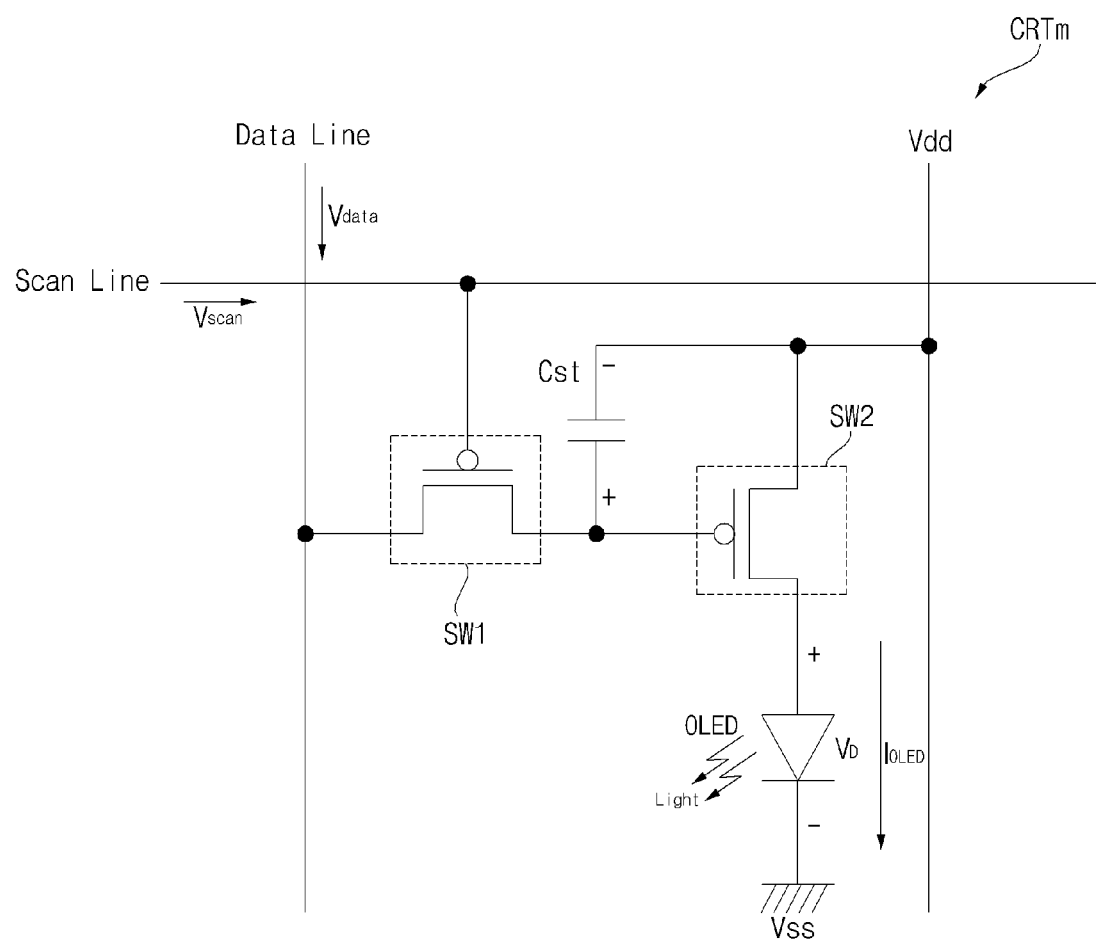

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scanl to Scann and a plurality of data lines R1, Gl, Bl, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRTm) may include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst changes according to the level difference of the data signal Vdata.

For another example, when the data signal has a different pulse width according to a Pluse Width Modulation (PWM) method, the power level stored in the storage capacitor Cst changes according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), or an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Meanwhile, with development of camera and broadcasting technologies, resolution and vertical synchronization frequencies for input images have improved as well. In particular, there are increasing need of image quality processing on an image signal having 4K resolution and 120 Hz vertical synchronization frequency. Accordingly, a method of improving image quality processing of an input image signal is proposed. A detailed description thereof is hereinafter provided with reference to FIG. 7 and other drawings.

Figure 7:
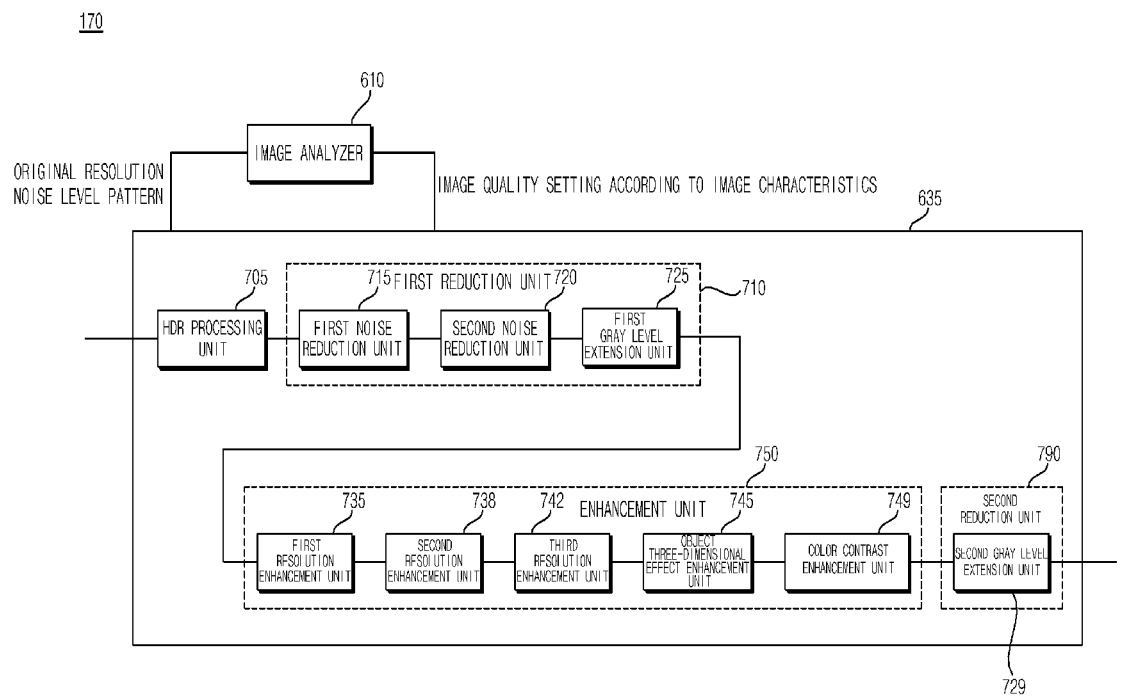
FIG. 7 is an example of an internal block diagram of a signal processing device according to an embodiment of the present disclosure.

FIG. 7 is an example of an internal block diagram of a signal processing device according to an embodiment of the present disclosure.

Meanwhile, a signal processing device 170 in FIG. 7 may correspond to the signal processor 170 in FIG. 2.

First, referring to FIG. 7, the signal processing device 170 according to an embodiment of the present disclosure may include an image analyzer 610 and an image quality processor 635.

The image analyzer 610 may analyze an input image signal, and output information related to the analyzed input image signal.

Meanwhile, the image analyzer 610 may differentiate an object region and a background region of a first input image signal. Alternatively, the image analyzer 610 may calculate a probability or percentage of the object region and the background region of the first input image signal.

The input image signal may be an input image signal from an image receiver 105 or an image decoded by the image decoder 320 in FIG. 3.

In particular, the image analyzer 610 may analyze an input image signal using artificial intelligence (AI), and output information on the analyzed input image signal.

Specifically, the image analyzer 610 may output a resolution, gray level, a noise level, and a pattern of an input image signal, and output information on the analyzed input image signal, especially image setting information, to the image quality processor 635.

The image quality processor 635 may include an HDR processor 705, a first reducer 710, an enhancer 750, and a second reducer 790.

The HDR processor 705 may receive an image signal and perform high dynamic range (HDR) processing on the input image signal.

For example, the HDR processor 705 may convert a standard dynamic range (SDR) image signal into an HDR image signal.

For another example, the HDR processor 705 may receive an image signal, and perform gray level processing on the input image signal for an HDR.

Meanwhile, if an input image signal is an SDR image signal, the HDR processor 705 may bypass gray level conversion, and, if an input image signal is an HDR image signal, the HDR processor 705 may perform gray level conversion. Accordingly, it is possible to reduce a delay time in outputting an output image having a size different from a size of an input image.

Meanwhile, the HDR processor 705 may perform gray level conversion processing based on a first gray level conversion mode, in which low gray level is to be enhanced and high gray level is to be saturated, and a second gray level conversion mode, in which low gray level and high gray level are somewhat uniformly converted.

The HDR processor 705 may perform gray level conversion processing based on a first gray level conversion curve or a second gray level conversion curve.

For example, the HDR processor 705 may perform gray level conversion processing based on data in a lookup table corresponding to the first gray level conversion curve or based on data in a lookup table corresponding to the second gray level conversion curve.

Specifically, if the first gray level conversion mode is implemented, the HDR processor 705 may perform gray level conversion processing based on data corresponding to the first gray level conversion mode in a lookup table.

More specifically, if the first gray level conversion mode is implemented, the HDR processor 705 may perform gray level conversion processing based on an equation of input data and the first gray level conversion mode in a lookup table determined by the equation. Here, the input data may include video data and metadata.

Meanwhile, if the second gray level conversion mode is implemented, the HDR processor 705 may perform gray level conversion processing based on data corresponding to the second gray level conversion mode in a lookup table.

More specifically, if the second gray level conversion mode is implemented, the HDR processor 705 may perform gray level conversion processing based on an equation of input data and data corresponding to the second gray level conversion mode in a lookup table determined by the equation. Here, the input data may include video data and metadata.

Meanwhile, the HDR processor 705 may select the first gray level conversion mode or the second gray level conversion mode according to a third gray level conversion mode or a fourth gray level conversion mode in a high gray level amplifier 851 in the second reducer 790.

For example, if the third gray level conversion mode is implemented, the high gray level amplifier 851 in the second reducer 790 may perform gray level conversion processing based o data corresponding to the third gray level conversion mode in a lookup table.

Specifically, if the third gray level conversion mode is implemented, the high gray level amplifier 851 in the second reducer 790 may perform gray level conversion processing based on an equation of input data and data corresponding to the third gray level conversion mode in a lookup table determined by the equation. Here, the input data may include video data and metadata.

Meanwhile, if the fourth type gray level conversion is implemented, the high gray level amplifier 851 in the second reducer 790 may perform gray level conversion processing based on data corresponding to the fourth gray level conversion mode in a lookup table.

Specifically, if the fourth gray level conversion mode is implemented, the high gray level amplifier 851 in the second reducer 790 may perform gray level conversion processing based on an equation of input data and data corresponding to the fourth gray level conversion mode in a lookup table determined by the equation. Here, the input data may include video data and metadata.

For example, if the fourth gray level conversion mode is implemented in the high gray level amplifier 851 in the second reducer 790, the HDR processor 705 may implement the second gray level conversion mode.

For another example, if the third gray level conversion mode is implemented in the high gray level amplifier 851 in the second reducer 790, the HDR processor 705 may implement the first gray level conversion mode.

Alternatively, the high gray level amplifier 851 in the second reducer 790 may change a gray level conversion mode according to a gray level conversion mode in the HDR processor 705.

For example, if the second gray level conversion mode is implemented in the HDR processor 705, the high gray level amplifier 851 in the second reducer 790 may perform the fourth gray level conversion mode.

For another example, if the first gray level conversion mode is implemented in the HDR processor 705, the high gray level amplifier 851 in the second reducer 790 may implement the third gray level conversion mode.

Meanwhile, the HDR processor 705 according to an embodiment of the present disclosure may implement a gray level conversion mode so that low gray level and high gray level are converted uniformly.

That is, the HDR processor 705 may perform gray level conversion processing based on the second gray level conversion curve, not the first gray level conversion curve.

Meanwhile, according to the second gray level conversion mode in the HDR processor 705, the second reducer 790 may implement the fourth gray level conversion mode and thereby amplify an upper limit on the gray level of a received input signal. Accordingly, it is possible to reduce a delay time in outputting an output image having a size different from a size of an input image.

Next, the first reducer 710 may perform noise reduction on an input image signal or an image signal processed by the HDR processor 705.

Specifically, the first reducer 710 may perform multiple stages of noise reduction processing and a first stage of gray level extension processing on an input image signal or an HDR image from the HDR processor 705.

To this end, the first reducer 710 may include a plurality of noise reduction parts 715 and 720 for reducing noise in multiple stages, and a first gray level extender 725 for extending gray level.

Next, the enhancer 750 may perform multiple stages of image resolution enhancement processing on an image from the first reducer 710.

In addition, the enhancer 750 may perform object three-dimensional effect enhancement processing. In addition, the enhancer 750 may perform color or contrast enhancement processing.

To this end, the enhancer 750 may include: a plurality of resolution enhancers 735, 738, 742 for enhancing a resolution of an image in multiple stages; an object three-dimensional effect enhancer 745 for enhancing a three-dimensional effect of an object; and a color contrast enhancer 749 for enhancing color or contrast.

Next, the second reducer 790 may perform a second stage of gray level extension processing based on a noise-reduced image signal received from the first reducer 710.

Meanwhile, the second reducer 790 may amplify an upper limit on the gray level of an input signal, and extend a resolution of the high gray level of the input signal. Accordingly, it is possible to reduce a delay time in outputting an output image having a size different from a size of an input image.

For example, gray level extension may be performed uniformly on the entire gray level range of an input signal. Accordingly, gray level extension is performed uniformly on the entire area of an input image, thereby improving high gray level expression.

Meanwhile, the second reducer 790 may perform gray level amplification and extension based on a signal received from the first gray level extender 725. Accordingly, it is possible to reduce a delay time in outputting an output image having a size different from a size of an input image.

Meanwhile, if an input image signal input is an SDR image signal, the second reducer 790 may change the degree of amplification based on a user input signal. Accordingly, it is possible to improve high gray level expression in response to a user setting.

Meanwhile, if an input image signal is an HDR image signal, the second reducer 790 may perform amplification according to a set value. Accordingly, it is possible to reduce a delay time in outputting an output image having a size different from a size of an input image.

Meanwhile, if an input image signal is an HDR image signal, the second reducer 790 may change the degree of amplification based on a user input signal. Accordingly, it is possible to improve high gray level expression according to a user setting.

Meanwhile, in the case of extending gray level based on a user input signal, the second reducer 790 may change the degree of extension of gray level. Accordingly, it is possible to improve high gray level expression according to a user's setting.

Meanwhile, the second reducer 790 may amplify an upper limit on the gray level according to a gray level conversion mode in the HDR processor 705. Accordingly, it is possible to reduce a delay time in outputting an output image having a size different from a size of an input image.

The signal processing device 170 includes the HDR processor 705 configured to receive an image signal and adjust luminance of the input image signal, and the reducer 790 configured to amplify brightness of the image signal received from the HDR processor 705 and increase gray level resolution of the image signal to thereby generate an enhanced image signal. The enhanced image signal provides increased luminance and increased gray level resolution of the image signal while a high dynamic range in a displayed HDR image is maintained.

Meanwhile, the range of brightness of the image signal is adjusted by a control signal received by the signal processing device 170.

Meanwhile, the signal processing device 170 further includes an image analyzer configured to determine whether an input image signal is an HDR signal or an SDR signal, and generate a control signal to be provided to the HDR processor 705. The range of brightness of an input image signal is adjusted by a control signal only in response to the input image signal being an HDR signal.

Meanwhile, the control signal is received from a controller of an image display apparatus, which relates to signal processing, and the control signal corresponds to a setting of the image display apparatus.

Meanwhile, a resolution of gray level is increased based on amplification of adjusted brightness of an image signal.

Meanwhile, a resolution of gray level is increased based on a control signal received by the signal processing device 170.

Meanwhile, a control signal is received from a controller of an image display apparatus, which relates to signal processing, and the control signal corresponds to a setting of the image display apparatus.

Meanwhile, the reducer 790 may include the high gray level amplifier 851 configured to amplify an upper limit on gray level of an input signal, and a decontourer 842 and 844 configured to extend the resolution of gray level amplified by the high gray level amplifier 851.

The second reducer 790 may include a second gray level extender 729 for a second stage of gray level extension.

Figure 8:
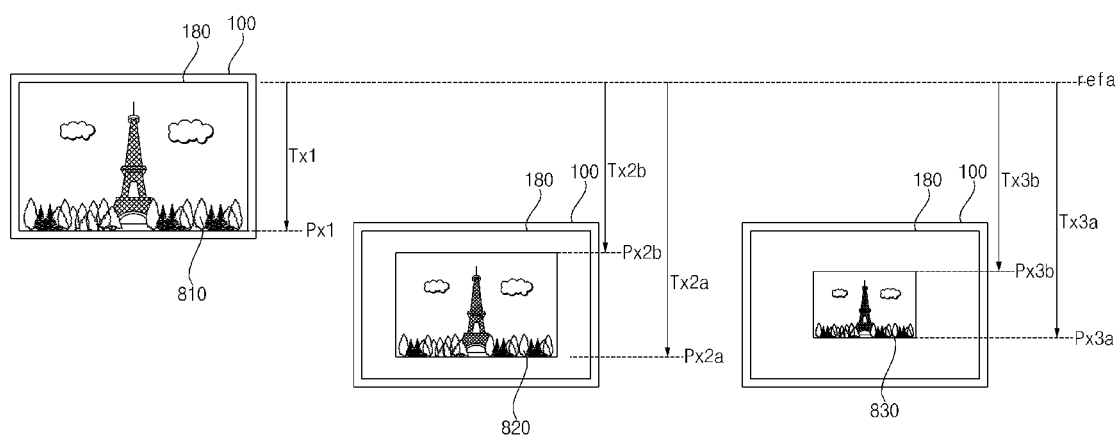
FIGS. 8 and 9 are diagrams illustrating a time delay occurring in response to a size of an output image being changed in comparison with a size of an input image.

Meanwhile, the image quality processor 635 in the signal processing device 170 according to the present disclosure is characterized in performing four stages of reduction processing and four stages of image enhancement processing, as shown in FIG. 8.

Here, the four stages of reduction processing may include two stages of noise reduction processing and two stages of gray level extension processing.

Herein, the two stages of noise reduction processing may be performed by the first and second noise reduction parts 715 and 720 in the first reducer 710, and the two stages of gray level extension processing may be performed by the first gray level extender 725 in the first reducer 710 and the second gray level extender 729 in the second reducer 790.

Meanwhile, the four stages of image enhancement processing may include three stages of image resolution enhancement (bit resolution enhancement) and object three-dimensional effect enhancement.

Here, the three stages of image enhancement processing may be performed by the first to third resolution enhancers 735, 738, and 742, and the object three-dimensional effect enhancement may be performed by the object three-dimensional enhancer 745.

Meanwhile, the first characteristic of the signal processing device 170 of the present disclosure lies in applying the same algorithm or similar algorithms to image quality processing multiple times, thereby gradually enhancing an image quality.

To this end, the image quality processor 635 of the signal processing device 170 of the present disclosure may perform image quality processing by applying the same algorithm or similar algorithms two or more times.

Meanwhile, the same algorithm or the similar algorithms implemented by the image quality processor 635 have a different purpose to achieve in each stage. In addition, since image quality processing is performed gradually in multiple stages, there is an advantageous effect to cause a less number of artifacts to appear in an image, resulting in a more natural and more vivid image processing result.

Meanwhile, the same algorithm or the similar algorithms are applied multiple times alternately with a different image quality algorithm, thereby bringing an effect more than simple continuous processing.

Meanwhile, another characteristic of the signal processing device 170 of the present disclosure lies in performing noise reduction processing in multiple stages. Each stage of noise reduction processing may include temporal processing and spatial processing.

Meanwhile, the high dynamic range (HDR) technique utilizes a much greater range of luminosity (nit) than is possible a standard dynamic range (SDR) or any other existing technique, and accordingly a much wide range of contrast may be expressed.

Recently, it is possible to generate a high dynamic range image using a high-specification camera having a wide dynamic range.

Meanwhile, a SDR image is in a ordinary dynamic range, and may express approximately 100 nit or less according to a broadcasting standard.

However, the high dynamic range technique, which has been widely used in recent years, enables expressing a wider range up to approximately 10,000 nit.

Accordingly, when the high dynamic range technique is employed, image characteristics changes greatly compared to the existing ordinary dynamic range, and thus, it is required to change overall system such as an image format, a related metadata, a compression scheme, an interface between devices, the display 180, etc. in order to express the change in the image characteristics.

The present disclosure relates to a method for performing tone mapping to maintain a quality of a source image intact when an existing ordinary dynamic range image or a high dynamic range image is reproduced in a display apparatus which has been developed with a wider dynamic range.

In particular, since there are many cases where the dynamic range of an image is different from the dynamic range of the display 180, it is necessary to map the dynamic range of the image suitably for the display 180.

Meanwhile, it is necessary to express luminance (brightness) of a reproducible range intact and perform image quality processing on a brightness component of a nonreproducible range so as to minimize damage to image quality compared to a source image.

In addition, a transformation function by which a user's desired intention is reflected is required as well.

Figure 9:
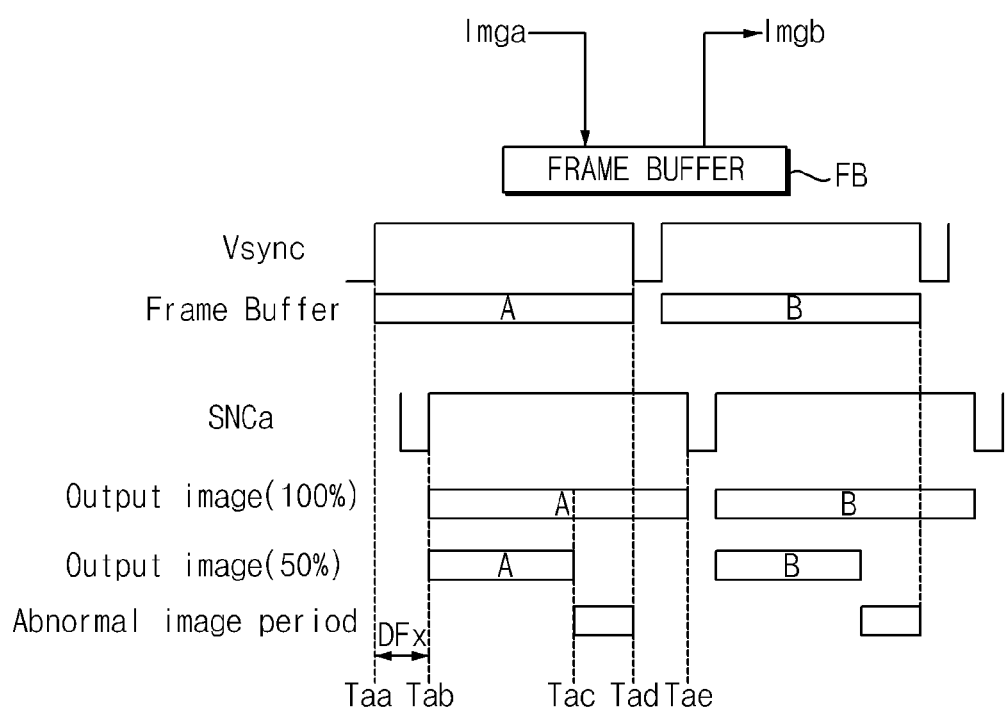

FIGS. 8 and 9 are diagrams illustrating a time delay occurring in response to a size of an output image being changed in comparison with a size of an input image.

First, FIG. 8 illustrates that a first image 810 is displayed on the display 180 of the image display apparatus 100.

For example, in the case that an input image having a first size, which is input from the exterior set-top box 300, is input to the frame buffer (FB), and outputted thereafter, an output period may be Tx1 based on an output timing "refa". For example, the output period may be a period of 1/60 Hz.

That is, in the case that an output start timing is "refa", an output end timing may be Px1.

Meanwhile, in the case that an input image having a first size, which is input from the exterior set-top box 300, is input to the frame buffer (FB), and an image having a second size, which is less than the first size, is outputted thereafter, owing to the image scaling, an output start timing may be Px2b, which is delayed by Tx2b based on the output timing "refa", and an output end timing may be Px2a, which is delayed by Tx2a based on the output timing "refa"

In other words, the output start timing of the second size having a different size may be delayed from the output end timing of the output image having the first size. Accordingly, significant output delay and image display delay occur. Therefore, a problem occurs in that a screen is split in response to the image having the second size being displayed.

Meanwhile, in the case that an input image having a first size, which is input from the exterior set-top box 300, is input to the frame buffer (FB), and an image having a third size, which is less than the first size, is outputted thereafter, owing to the image scaling, an output start timing may be Px3b, which is delayed by Tx3b based on the output timing "refa", and an output end timing may be Px3a, which is delayed by Tx3a based on the output timing "refa"

In this case, Px3b may be a timing later than Px2b, and Px3a may be a timing earlier than Px2a.

That is, the output start timing of the third size having a different size may be delayed from the output end timing of the output image having the first size. Accordingly, significant output delay and image display delay occur. Therefore, a problem occurs in that a screen is split in response to the image having the third size being displayed.

Referring to FIG. 9, after a predetermined time from an input synchronization signal of the frame buffer (FB), an output image is synchronized with a fixed output synchronization signal SNCa of the frame buffer (FB), and the output image is output from the frame buffer (FB).

In the drawing, it is illustrated that a start timing of the input synchronization signal is Taa, and a start timing of the fixed output synchronization signal SNCa is Tab. That is, the predetermined time may correspond to DFx.

For example, in the case that a size of the output image is the first size, which is the same as the size of the input image, that is, in the case that the size of the output size is 100%, an output start timing in the frame buffer (FB) may be "tab", and an output end timing may be "tad".

Meanwhile, in the case that a size of the output image is the second size, which is different from the size of the input image, that is, in the case that the size of the output size is 50% in comparison with the input image, an output start timing in the frame buffer (FB) may be "tab", and an output end timing may be "tac".

In this case, in an abnormal image period between "tac" timing and "tad" timing, a problem may occur that a screen is split in response to the image being displayed on the display 180.

Figure 10:
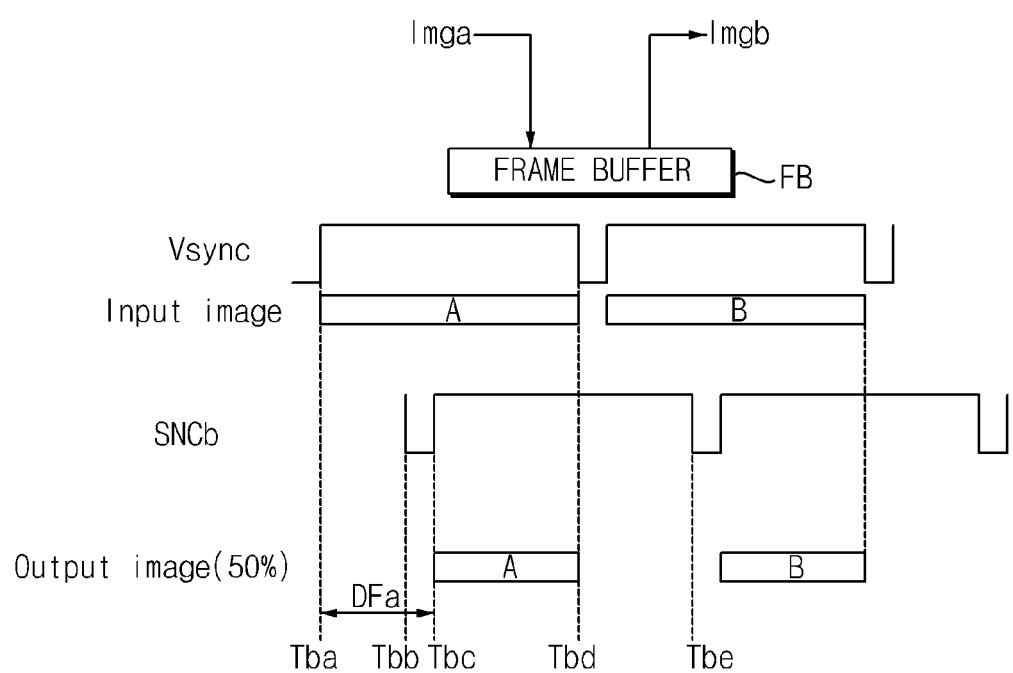
FIG. 10 is a diagram illustrating a method of reducing a time delay occurring in response to a size of an output image being changed in comparison with a size of an input image according to an embodiment of the present disclosure.

Accordingly, in the present disclosure, as shown in FIG. 9, the fixed output synchronization signal SNCa is not used, and as shown in FIG. 10, based on a size of the output image of the frame buffer (FB), a variable output synchronization signal SNCb for which a start timing is varied is used.

Furthermore, in the present disclosure, as shown in FIG. 9, the fixed output synchronization signal SNCa is not used, and as shown in FIG. 10, based on a position of the output image of the frame buffer (FB), a variable output synchronization signal SNCb for which a start timing is varied is used.

FIG. 10 is a diagram illustrating a method of reducing a time delay occurring in response to a size of an output image being changed in comparison with a size of an input image according to an embodiment of the present disclosure.

Referring to FIG. 9, after a predetermined time from an input synchronization signal of the frame buffer (FB), an output image is synchronized with the variable output synchronization signal SNCb of the frame buffer (FB), and the output image is output from the frame buffer (FB).

In the drawing, it is illustrated that a start timing of the input synchronization signal is Taa, and a start timing of the variable output synchronization signal SNCb is Tbb later than Tab. That is, the predetermined time may correspond to DFa.

In this case, the predetermined time DFa may be varied based on a size of the output image.

That is, a difference between a start timing of the input synchronization signal Vsync of the frame buffer (FB) and a start timing of the output synchronization signal SNCb of the frame buffer (FB), DFa, may be varied based on a size of the output image in comparison with the input image.

For example, as the size of the output image in comparison with the input image decreases, it is preferable that a difference between a start timing of the input synchronization signal Vsync of the frame buffer (FB) and a start timing of the output synchronization signal SNCb of the frame buffer (FB), DFa, increases. Accordingly, a delay of the output period of the output image in the frame buffer (FB) may be prevented.

For example, in the case that a size of the output image is the second size, which is different from the size of the input image, that is, in the case that the size of the output size is 50% in comparison with the input image, an output start timing in the frame buffer (FB) may be "tbc", and an output end timing may be "tbd". Accordingly, a delay of the output period of the output image in the frame buffer (FB) may be prevented. Furthermore, in response to the output image of which size is different being output in comparison with the size of the input image, a screen may be displayed normally.

Meanwhile, a difference between a start timing of the input synchronization signal Vsync of the frame buffer (FB) and a start timing of the output synchronization signal SNCb of the frame buffer (FB), DFa, may be varied based on a display position of the output image in comparison with the input image. Accordingly, in response to the output image of which position is different being output in comparison with the size of the input image, a delay time may be reduced.

Figure 11:
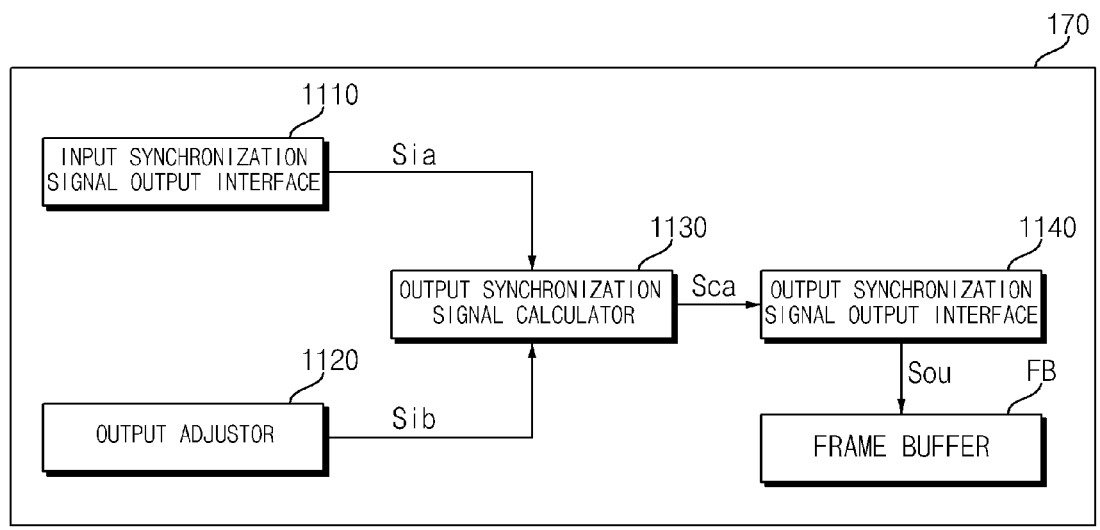
FIG. 11 is an example of an internal block diagram of a signal processor according to an embodiment of the present disclosure.

FIG. 11 is an example of an internal block diagram of a signal processor according to an embodiment of the present disclosure.

Referring to the drawing, the signal processor 170 according to an embodiment of the present disclosure may include an input synchronization signal output interface 1110 configured to output an input synchronization signal Vsync, an output adjustor 1120 configured to provide output position or output size information Sib, an output synchronization signal calculator 1130 configured to calculate a variable output synchronization signal, an output synchronization signal output interface 1140 configured to output a variable output synchronization signal based on a signal Sca from the output synchronization signal calculator 1130, and a frame buffer (FB) configured to output an output image of which size changes based on the variable output synchronization signal Sou.

According to the present disclosure, it is preferable that a difference between a start timing of the input synchronization signal Vsync of the frame buffer (FB) and a start timing of the output synchronization signal SNCb of the frame buffer (FB) varies. Accordingly, in response to the output image of which position is different being output in comparison with the size of the input image, a delay time may be reduced. Furthermore, a screen may be normally displayed in outputting the output image having a size different from a size of the input image.

For example, according to the present disclosure, as the size of the output image in comparison with the input image decreases, it is preferable that a difference between a start timing Tba of the input synchronization signal Vsync of the frame buffer (FB) and a start timing Tbc of the output synchronization signal SNCb of the frame buffer (FB) increases. Accordingly, a delay time may be reduced in response to the output image having a size different from a size of the input image being output. Furthermore, a screen may be normally displayed in response to the output image having a size different from a size of the input image being output.

Meanwhile, it is preferable that a difference between a start timing of the input synchronization signal Vsync of the frame buffer (FB) and a start timing of the output synchronization signal SNCb of the frame buffer (FB) varies. Accordingly, a delay time may be reduced in response to the output image having a size different from a size of the input image being output. Furthermore, a screen may be normally displayed in response to the output image having a size different from a size of the input image being output.

For example, as a position of the output image becomes closer to a lower direction of the display 180 in comparison with the input image, it is preferable that a difference between a start timing Tba of the input synchronization signal Vsync of the frame buffer (FB) and a start timing Tbc of the output synchronization signal SNCb of the frame buffer (FB) increases. Accordingly, a delay time may be reduced in response to the output image having a size different from a size of the input image being output.

Meanwhile, in comparison with an input image, it is preferable that an output end timing of an output image having a first size in the case that the output image having the first size is output from the frame buffer (FB) is the same as an output end timing of an output image having a second size in the case that the output image having the second size, which is less than the first size, is output from the frame buffer (FB) in comparison with an input image. Accordingly, a delay time may be reduced in response to the output image having a size different from a size of the input image being output.

Meanwhile, it is preferable that an output end timing of an output image having a second size, in comparison with an input image, is the same as an output end timing of an output image having a third size in the case that the output image having the third size, which is less than the second size, is output from the frame buffer (FB) in comparison with an input image. Accordingly, a delay time may be reduced in response to the output image having a size different from a size of the input image being output.

Meanwhile, it is preferable that an output start timing of an output image having a second size output from the frame buffer (FB) is later than an output start timing of an output image having a first size output from the frame buffer (FB). Accordingly, a delay time may be reduced in response to the output image having a size different from a size of the input image being output.

Meanwhile, it is preferable that an output start timing of an output image having a third size output from the frame buffer (FB) is later than an output start timing of an output image having a first size output from the frame buffer (FB). Accordingly, a delay time may be reduced in response to the output image having a size different from a size of the input image being output.

Meanwhile, it is preferable that an output start timing of an output image having a second size output from the frame buffer (FB) is earlier than an output end timing of an output image having a first size output from the frame buffer (FB). Accordingly, a delay time may be reduced in response to the output image having a size different from a size of the input image being output.

Meanwhile, it is preferable that an output start timing of an output image having a third size output from the frame buffer (FB) is later than an output end timing of an output image having a first size output from the frame buffer (FB). Accordingly, a delay time may be reduced in response to the output image having a size different from a size of the input image being output.

Meanwhile, an output adjustor configured to determine a size or a position of an output image may be further provided. Accordingly, a delay time may be reduced in response to the output image having a size different from a size of the input image being output.

Meanwhile, the signal processor 170 according to another embodiment of the present disclosure includes the frame buffer (FB) configured to store an input image and output an output image corresponding to the input image, and it is preferable that a difference between a start timing Tba of the input synchronization signal Vsync of the frame buffer (FB) and a start timing Tbc of the output synchronization signal SNCb of the frame buffer (FB) varies.

For example, according to the signal processor 170 according to another embodiment of the present disclosure, it is preferable that a difference between a start timing Tba of the input synchronization signal Vsync of the frame buffer (FB) and a start timing Tbc of the output synchronization signal SNCb of the frame buffer (FB) increases. Accordingly, a delay time may be reduced in response to the output image having a size different from a size of the input image being output. Furthermore, a screen may be normally displayed in response to the output image having a size different from a size of the input image being output.

Figure 12:
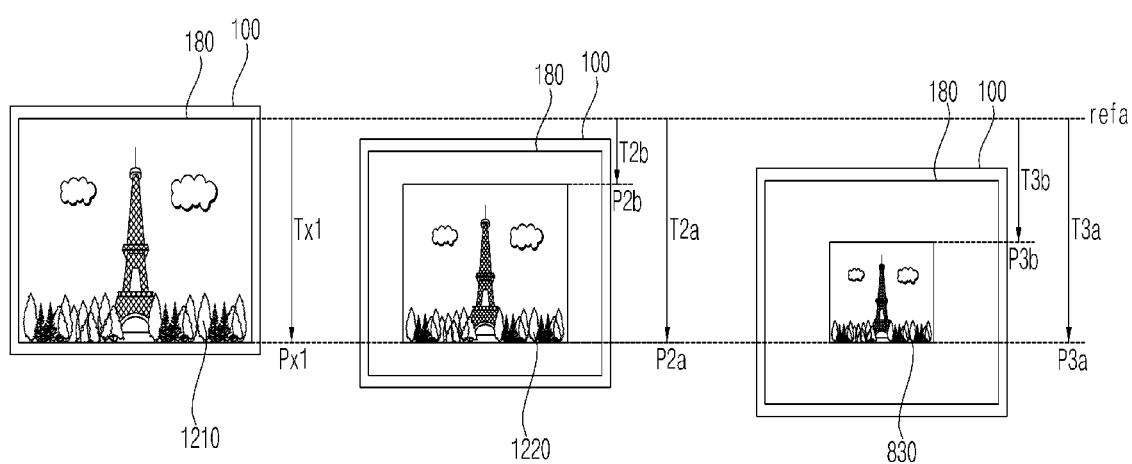
FIG. 12 is a diagram referring to the operation description of FIG. 11.

FIG. 12 is a diagram referred to the operation description of FIG. 11.

Referring to the drawing, it is illustrated that a first image 1210 is displayed on the display 180 of the image display apparatus 100.

For example, in the case that an input image having a first size, which is input from the exterior set-top box 300, is input to the frame buffer (FB), and outputted thereafter, an output period may be Tx1 based on an output timing "refa". For example, the output period may be a period of 1/60 Hz.

That is, in the case that an output start timing is "refa", an output end timing may be Px1.

Meanwhile, in the case that an input image having a first size, which is input from the exterior set-top box 300, is input to the frame buffer (FB), and an image having a second size, which is less than the first size, is outputted thereafter, owing to the image scaling, an output start timing may be P2b, which is delayed by T2b based on the output timing "refa", and an output end timing may be P2a, which is delayed by T2a based on the output timing "refa"

In this case, the P2a timing may be the same as the Px1 timing described above. Accordingly, a delay time may be minimized in response to an image having a different size being output.

Meanwhile, the delay of T2b may be very small delay in comparison with Tx2b shown in FIG. 8.

Particularly, the P2b timing related to the delay of T2b may be earlier than the output end timing Px1 of a first size. Accordingly, a delay time may be minimized in response to an image having a different size being output.

Meanwhile, in the case that an input image having a first size, which is input from the exterior set-top box 300, is input to the frame buffer (FB), and an image having a third size, which is less than the first size, is outputted thereafter, owing to the image scaling, an output start timing may be P3b, which is delayed by T3b based on the output timing "refa", and an output end timing may be P3a, which is delayed by T3a based on the output timing "refa".

In this case, P3b may be the same as the Px1 timing described above. Accordingly, a delay time may be minimized in response to an image having a different size being output.

Meanwhile, the delay of T3b may be very small delay in comparison with Tx3b shown in FIG. 8.

Particularly, the P3b timing related to the delay of T3b may be earlier than the output end timing Px1 of a first size. Accordingly, a delay time may be minimized in response to an image having a different size being output.

Meanwhile, the display 180 of the image display apparatus 100 shown in FIG. 8 to FIG. 12 may include an OLED panel, a liquid crystal panel, or the like, and the signal processor 170 may operate for an image display on the display 180.

Figure 13:
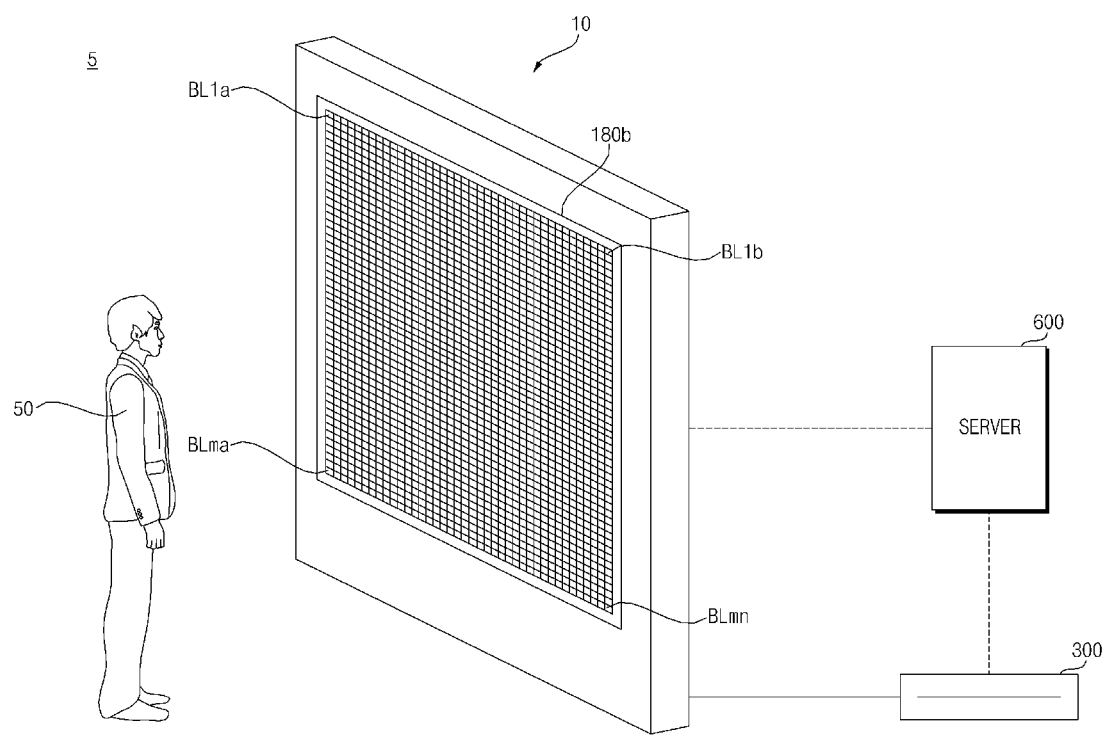
FIG. 13 is a diagram illustrating an image display apparatus according to another embodiment of the present disclosure.

FIG. 13 is a diagram illustrating an image display apparatus according to another embodiment of the present disclosure.

Referring to the drawing, the image display apparatus 10 according to another embodiment of the present disclosure may be provided with a display 180b including a plurality of light emitting diode blocks BL1a to BLmn.

In this case, the image display apparatus 10 may be an electronic signage or a display based on LEDs.

Meanwhile, the operation of the signal processor 170 described as shown in FIG. 8 to FIG. 12 may be directly applied to the image display apparatus 10 provided with the display 180b including a plurality of light emitting diode blocks BL1a to BLmn.

Figure 14A:
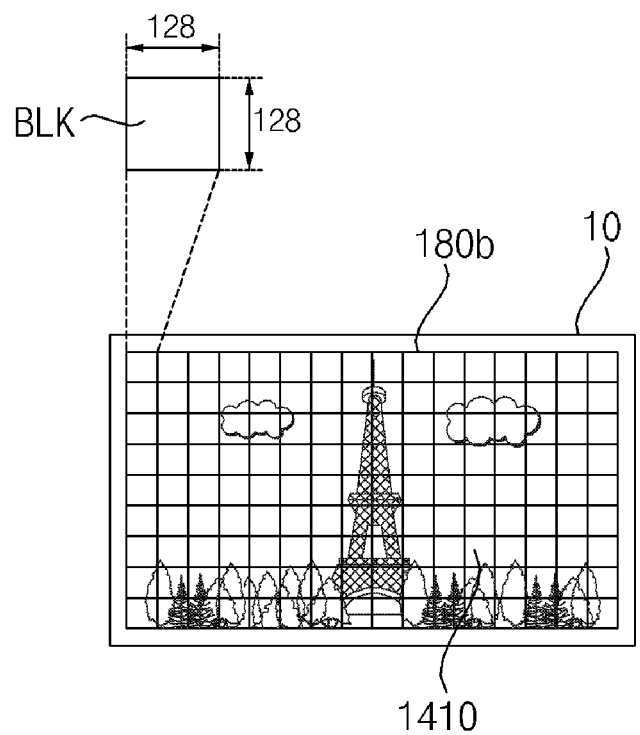
FIGS. 14a and 14b are diagrams referring to the description of the image display apparatus shown in FIG. 12.
Figure 14B:
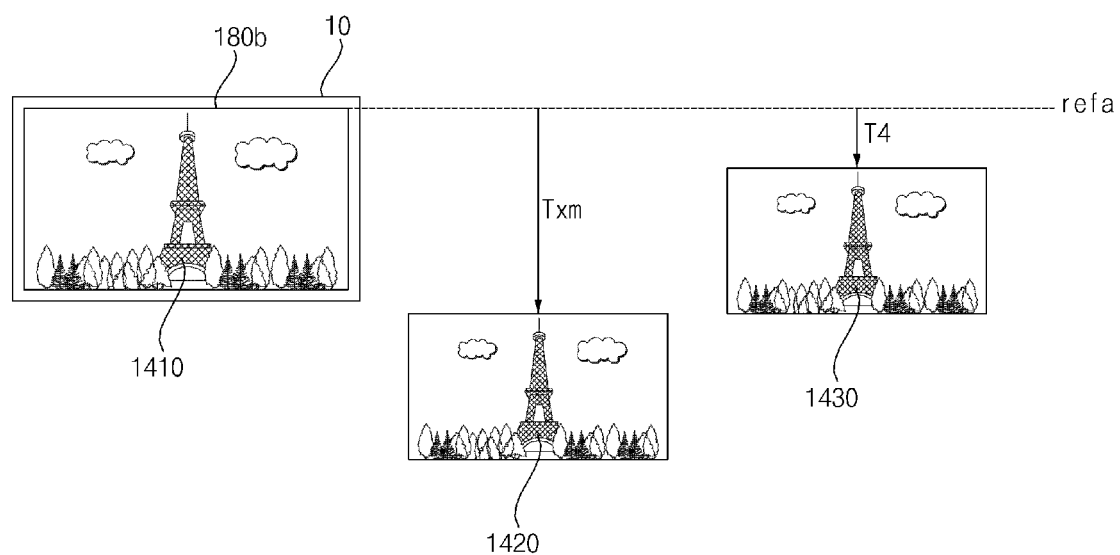

FIGS. 14a and 14b are diagrams referred to the description of the image display apparatus shown in FIG. 12.

FIG. 14a illustrates that an image 1410 of a first size is displayed on the display 180b including a plurality of light emitting diode blocks BLK.

FIG. 14b illustrates that the image 1410 is displayed on the display 180b of the image display apparatus 10.

Meanwhile, in the case that an input image having a first size, which is input from the exterior set-top box 300, is input to the frame buffer (FB), and an image having a second size, which is less than the first size, is outputted thereafter, in the case that a fixed output synchronization signal is used, owing to the image scaling, an output start timing is delayed by Txm based on the output timing "refa", and an image 1420 of the second size may be displayed.

Accordingly, in the present disclosure, to improve the problem, a variable output synchronization signal, not the fixed output synchronization signal, is used.

That is, it is preferable that the operation in the signal processor 170 is performed as described in FIG. 10 to FIG. 12.

Accordingly, as shown in FIG. 14b, in the case that an input image having a first size, which is input from the exterior set-top box 300, is input to the frame buffer (FB), and an image having a second size, which is less than the first size, is outputted thereafter, in the case that the variable output synchronization signal is used, despite the image scaling, an output start timing is delayed by T4 period which is less delayed than Txm based on the output timing "refa", and an image 1430 of the second size may be displayed.

Accordingly, a delay time may be reduced in response to the output image having a size different from a size of the input image being output. Furthermore, a screen may be normally displayed in response to the output image having a size different from a size of the input image being output.

While the present disclosure has been particularly shown and described with reference to exemplary embodiments thereof, it is clearly understood that the present disclosure is not limited to the specific embodiment described above, and various modifications are available to those ordinary skilled in the art without departing from the subject matter claimed in the accompanying claims. Further, the various modification s should not be individually understood from the technical concept or prospect of the present disclosure.

What is claimed is:

1. A signal processing device comprising:
 a frame buffer configured to store an input image and output an output image corresponding to the input image;
 an output synchronization signal calculator configured to calculate an output synchronization signal based on an input synchronization signal and a size or a position of the output image in comparison with the input image; and
 an output synchronization signal output interface configured to output a variable output synchronization signal of which a start timing changes based on a signal from the output synchronization signal calculator,
 wherein a difference between a start timing of the input synchronization signal and a start timing of the output synchronization signal changes based on the size of the output image in comparison with the input image, and
 wherein the difference between the start timing of the input synchronization signal and the start timing of the output synchronization signal changes based on the position of the output image in comparison with the input image.

2. The signal processing device of claim 1, as the size of the output image decreases in comparison with the input image, the difference between the start timing of the input synchronization signal and the start timing of the output synchronization signal increases.

3. The signal processing device of claim 1, as a position of the output image becomes closer to a lower direction of a display in comparison with the input image, the difference between the start timing of the input synchronization signal and the start timing of the output synchronization signal increases.

4. The signal processing device of claim 1, wherein an output end timing of an output image having a first size in response to the output image having the first size being output from the frame buffer is the same as an output end timing of an output image having a second size in response to the output image having the second size, which is less than the first size, being output from the frame buffer in comparison with an input image.

5. The signal processing device of claim 4, wherein an output end timing of an output image having the second size, in comparison with the input image, is the same as an output end timing of an output image having a third size in response to the output image having the third size, which is less than the second size, being output from the frame buffer in comparison with the input image.

6. The signal processing device of claim 4, wherein an output start timing of the output image having the second size output from the frame buffer is later than an output start timing of the output image having the first size output from the frame buffer.

7. The signal processing device of claim 5, wherein an output start timing of the output image having the third size output from the frame buffer is later than an output start timing of the output image having the first size output from the frame buffer.

8. The signal processing device of claim 4, wherein an output start timing of the output image having the second size output from the frame buffer is earlier than an output end timing of the output image having the first size output from the frame buffer.

9. The signal processing device of claim 5, wherein an output start timing of the output image having the third size output from the frame buffer is earlier than an output end timing of the output image having the first size output from the frame buffer.

10. The signal processing device of claim 1, further comprising:
an output adjustor configured to determine a size or a position of the output image.

11. A signal processing device comprising:
a frame buffer configured to store an input image and output an output image corresponding to the input image,
wherein a difference between a start timing of the input synchronization signal and a start timing of the output synchronization signal of the frame changes based on a size or a position of the output image in comparison with the input image, and
wherein, as the size of the output image decreases in comparison with the input image, the difference between the start timing of the input synchronization signal and the start timing of the output synchronization signal increases.

12. The signal processing device of claim 11, as a position of the output image becomes closer to a lower direction of a display in comparison with the input image, the difference between the start timing of the input synchronization signal and the start timing of the output synchronization signal increases.

13. The signal processing device of claim 11, wherein an output end timing of an output image having a first size in response to the output image having the first size being output from the frame buffer is the same as an output end timing of an output image having a second size in response to the output image having the second size, which is less than the first size, being output from the frame buffer in comparison with an input image.

14. The signal processing device of claim 13, wherein an output end timing of an output image having the second size, in comparison with the input image, is the same as an output end timing of an output image having a third size in response to the output image having the third size, which is less than the second size, being output from the frame buffer in comparison with the input image.

15. The signal processing device of claim 13, wherein an output start timing of the output image having the second size output from the frame buffer is earlier than an output end timing of the output image having the first size output from the frame buffer.

16. The signal processing device of claim 14, wherein an output start timing of the output image having the third size output from the frame buffer is earlier than an output end timing of the output image having the first size output from the frame buffer.

17. An image display apparatus comprising:
a display; and
a signal processing device configured to control the display,
wherein the signal processing device comprises:
a frame buffer configured to store an input image and output an output image corresponding to the input image;
an output synchronization signal calculator configured to calculate an output synchronization signal based on an input synchronization signal and a size or a position of the output image in comparison with the input image; and
an output synchronization signal output interface configured to output a variable output synchronization signal of which a start timing changes based on a signal from the output synchronization signal calculator,
wherein a difference between a start timing of the input synchronization signal and a start timing of the output synchronization signal changes based on the size of the output image in comparison with the input image, and
wherein the difference between the start timing of the input synchronization signal and the start timing of the output synchronization signal changes based on the position of the output image in comparison with the input image.

* * * * *